April 12, 1932. G. E. TERWILLIGER ET AL 1,853,473
HOSE CONNECTION
Filed May 8, 1931
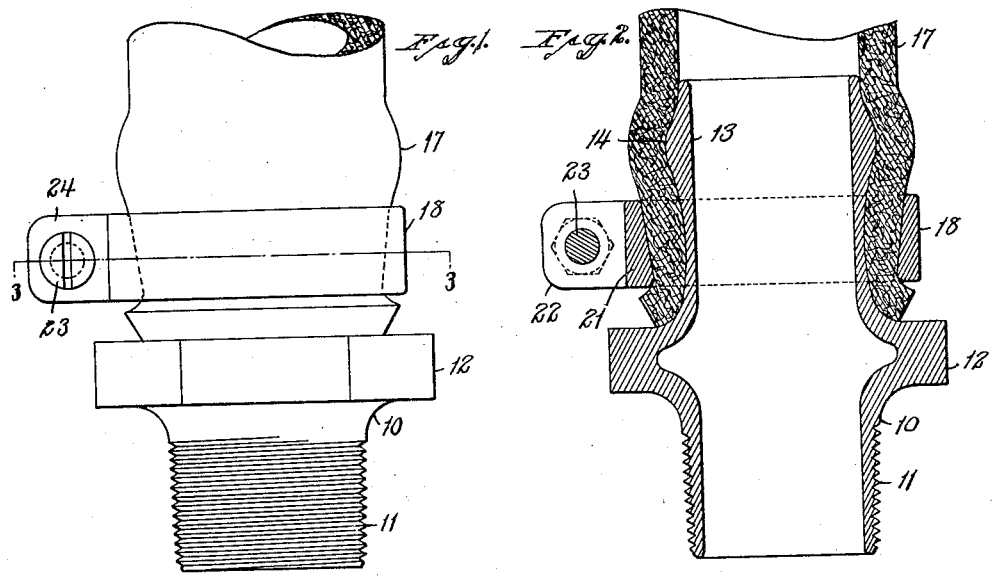
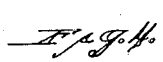
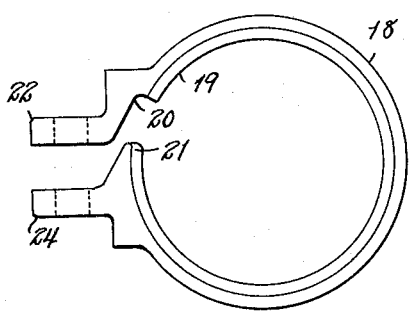
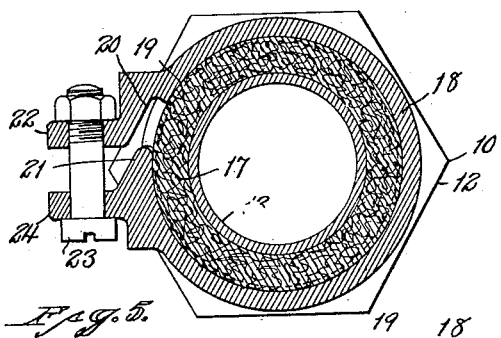
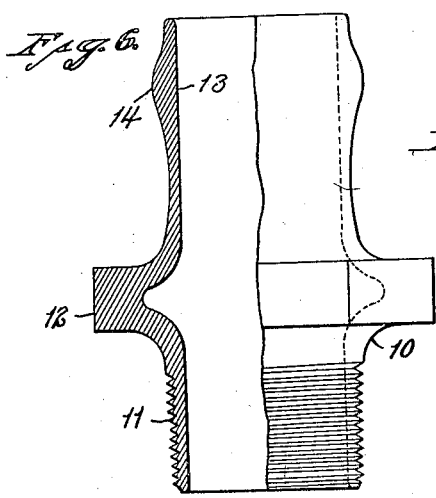
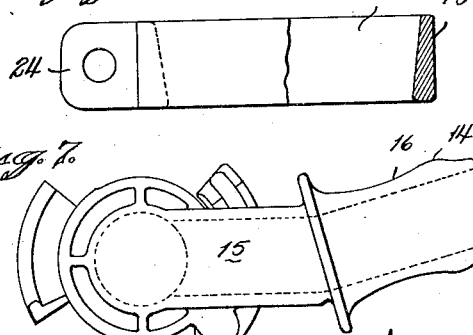
Inventors
George E. Terwilliger
Samuel Cook
by Seymour Earle & Nichols
attys Patented Apr. 12, 1932

1,853,473

UNITED STATES PATENT OFFICE

GEORGE E. TERWILLIGER, OF WEST HAVEN, AND SAMUEL COOK, OF STAMFORD, CONNECTICUT

HOSE CONNECTION

Application filed May 8, 1931. Serial No. 535,824.

This invention relates to improvement in hose connections such as are particularly used with hose for air-brake systems, and by the term "connections," as herein used, we wish to be understood as including the coupler-member at one end of the hose and the nipple-member at the other end. One difficulty experienced with air-brake hose is the liability of the hose to be sheared-off at the coupling, and the object of this invention is to so form the connections that while more perfect gripping may be secured, there will be less liability of shearing, and the invention consists in the construction as hereinafter described and particularly recited in the claims.

A further object is to provide a hose connection of the above general character, which may be inexpensively manufactured and installed.

A further object is to provide a connection of the above character particularly adapted for use with flexible train pipes, in which full freedom of movement of the flexible portion of the pipe is permitted without danger of marking the surfaces of the flexible pipe by reason of engagement with sharp ridges, projections, or edges.

A further object is to provide a device of the character last set forth, which may be applied easily and quickly to train pipes now in general use without otherwise changing the system.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as a part of this disclosure in which—

Fig. 1 is a side view of a hose nipple-member constructed in accordance with our invention;

Fig. 2 is a vertical sectional view of the same;

Fig. 3 is a sectional view on the line 3—3 of Fig. 1;

Fig. 4 is a plan view of the clamping-ring detached;

Fig. 5 is a broken sectional view of the same;

Fig. 6 is a side view, partly in section, of the nipple body-member detached; and Fig. 7 is a face view of a hose coupler-member detached and on a small scale.

In carrying out our invention, we employ a hose-nipple body-member 10 having the usual threaded coupling-shank 11, wrench-engaging portion 12, and hose-receiving nipple 13. These parts as shown in Figs. 1 and 2 are adapted for connection to a train pipe as mounted on a car, for example. As shown in Fig. 7 a coupler-member 15 having a hose-receiving nipple 16, is adapted to be connected to the other end of the flexible hose whereby the part 15 may coact with a complementary part at the end of the flexible hose on an adjacent car. The outer surfaces of the nipples 13 and 16 are enlarged near their outer ends, forming a swell 14 of ball effect below which the outer diameter of the nipples is inwardly curved on the arc of a circle and merging into the body-portions of the tubular members.

The end of a hose 17 of standard size is forced onto the nipples and while it is expanded over the swells or balls 14, it will be noted that the diameter of the nipples below the swell is but slightly greater than the normal internal diameter of the hose, and at this point a clamping-ring 18 is applied, this clamping-ring being of substantially usual construction except that its inner face 19 is formed at one end of the ring-portion with a tapered recess 20, and the other end with a tapered projection 21 entering the recess which provides a bearing for the projection which is forced into it when the ends 24 and 22 of the clamp are drawn together by a bolt 23. The inner face 19 is also outwardly tapered, corresponding to the curve of the adjacent wall of the coupling-members, so that as the ring is contracted, the end of the hose is uniformly clamped against the coupling-members, below the ball, and any tendency of the hose to pull off from the coupling-members will be resisted by the contraction of the space between the inner wall of the ring and the outer wall of the ball 14, and while this may compress the hose, it will not shear it off, and hence the life of the hose is greatly extended.

From the above description, it will be apparent that the present invention resides more particularly in a hose connection comprising a tubular body, one end of which is shaped for connection with either the fixed train pipe on the car or a member adapted to cooperate with the complementary member on an adjacent car, the opposite end of the body portion being of such shape and configuration as will make it particularly adaptable for connection with the flexible hose.

It has been found by experience that a hose connection provided with a nipple as herein shown and described obviates certain objections heretofore experienced in that all sharp ridges, projections, and edges are eliminated, thereby preventing damage to either the interior or exterior surfaces of the flexible hose. By having the nipple of ball-like curvature and the clamping ring with an inner surface normally lying substantially parallel to the surface, mutilation of the hose is prevented to a large degree and any danger of biting the hose between the sharp forward or outer edge of the clamping ring and adjacent part of the ball-shaped nipple is positively eliminated.

It is thus seen that the present invention provides a simple, practical, and reliable hose connection particularly suitable for train pipe use, which will accomplish among others all of the objects and advantages herein set forth.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

We claim:

1. A hose connection comprising a tubular body portion having one end adapted for connection to a train pipe or the like, and the other end adapted for connection to a flexible hose, said latter end being free from sharp edges and having an enlarged portion of ball-like curvature terminating in a smooth substantially thick rounded extremity, and a clamp adapted to embrace the hose about and behind the ball portion and having an internal surface substantially parallel to the adjacent ball-like surface.

2. A hose connection comprising a tubular body portion having one end adapted for connection to a train pipe or the like, and the other end adapted for connection to a flexible hose, said latter end being free from sharp edges and having an enlarged portion of ball-like curvature terminating in a smooth substantially thick rounded extremity, and a clamp adapted to embrace the hose about and behind the ball portion and having an internal surface substantially parallel to the adjacent ball-like surface, the central part of said tubular body portion being enlarged and having an outwardly flared surface blending with said ball-like end and adapted to be engaged by the end of the flexible hose.

3. A hose connection comprising a tubular body portion having one adapted for connection to a train pipe or the like, and the other end adapted for connection to a flexible hose, said latter end being free from sharp edges and having an enlarged portion of ball-like curvature terminating in a smooth substantially thick rounded extremity, and a clamp adapted to embrace the hose about and behind the ball portion and having an internal surface substantially parallel to the adjacent ball-like surface, said clamp having interfitting and overlapping portions adapted to be drawn together as the clamp is tightened about the hose.

In testimony whereof we have signed this specification.

G. E. TERWILLIGER.
SAMUEL COOK.